United States Patent [19]
Cadwell et al.
[11] Patent Number: 4,457,971
[45] Date of Patent: Jul. 3, 1984

[54] LITHOGRAPHIC SUBSTRATE AND ITS PROCESS OF MANUFACTURE

[75] Inventors: Donald E. Caldwell, St. Paul; Larry A. Brey, Woodbury, both of Minn.

[73] Assignee: Minnesota Mining and Manufacturing Company, St. Paul, Minn.

[21] Appl. No.: 411,626

[22] Filed: Aug. 26, 1982

Related U.S. Application Data

[63] Continuation-in-part of Ser. No. 299,720, Sep. 8, 1981, abandoned.

[51] Int. Cl.[3] ..... B32B 5/16
[52] U.S. Cl. ..... 428/323; 204/129.95; 428/325; 428/329; 428/332; 428/334; 428/335; 428/336; 430/65; 430/302; 430/925
[58] Field of Search ..... 106/66, 67, 39, 1.12; 430/925, 65; 204/129.95

[56] References Cited

U.S. PATENT DOCUMENTS

| | | | |
|---|---|---|---|
| 2,425,151 | 8/1947 | Greger | 106/67 |
| 2,425,152 | 8/1947 | Greger et al. | 106/67 |
| 2,995,453 | 8/1961 | Noble et al. | 106/39 |
| 3,210,184 | 10/1965 | Uhlig | 430/65 |
| 3,329,516 | 7/1967 | Chvatal et al. | 106/66 |
| 3,963,594 | 6/1976 | Brasko | 204/129.95 |
| 3,975,197 | 8/1976 | Mikelsons | 430/925 |
| 4,319,924 | 3/1982 | Collins, Jr. et al. | 106/1.12 |

OTHER PUBLICATIONS

Gonzalez et al., Bull. Am. Cer. Soc., vol. 59, No. 7, (1980), pp. 727-738.
Morris et al., Chemical Society Reviews, 6(2), 1977, pp. 173-195.
S. Wernick et al., "The Surface Treatment and Finishing of Aluminum and Its Alloys", 1972, pp. 33-38.

*Primary Examiner*—Thomas J. Herbert, Jr.
*Attorney, Agent, or Firm*—Donald M. Sell; James A. Smith; David L. Weinstein

[57] ABSTRACT

Lithographic printing substrates ordinarily require a mechanical or chemical graining of aluminum surfaces. Such substrates are difficult and expensive to make. It has been found that lithographically suitable substrates can be prepared by the firing of monobasic phosphate solutions with dispersed particles therein. The presence of reactive metallic oxides enhances the properties of the surface.

11 Claims, No Drawings

LITHOGRAPHIC SUBSTRATE AND ITS PROCESS OF MANUFACTURE

BACKGROUND OF THE INVENTION

This is a continuation-in-part of application Ser. No. 299,720, filed Sept. 8, 1981, now abandoned.

Lithographic printing plates have been widely used for many years. One of the basic concepts utilized in that technology is the establishment of differential wettability between areas on the planographic printing surface. This is most usually effected by providing a substrate having a hydrophilic or water wettable surface and coating that surface with an imageable (usually visible light or radiation sensitive) and developable grease compatible (oleophilic) and hydrophobic layer. After imaging and developing of this layer, the printing plate imagewise exposes hydrophilic and hydrophobic surfaces. When the plate is first wet with water and then coated with grease or oil-based printing inks, only the hydrophobic areas of the image will hold the ink and provide a transferred dark image when pressed against a receiving surface such as paper.

This lithographic process has been able to provide planographic printing plates which are capable of producing as few as hundreds of copies or as many as several hundred thousand high quality copies. The desirability of being able to produce large numbers of copies from a single plate are quite apparent. Only a single imaging and developing procedure must be performed, and the printing press need not be shut down during operation in order to change plates.

The investigation of means for lengthening the running time of planographic printing plates has been the focus of many studies and research. It is also necessary in the provision of more durable plates to maintain or improve such other desirable or essential characteristics of printing plates such as imaging speed, ease of development, non-polluting chemistry, and shelf life. Most of the research in providing longer running and higher durability planographic printing plates has centered on the imageable and hydrophobic coating layer on the hydrophilic surface of the substrate. As it is usually the breakdown of this layer which causes failure of the printing plate, the logic of that direction of research is apparent.

In general, the substrate provided for the imageable layer is an aluminum sheet which has been prepared for coating by a variety of cleaning, mechanical, and chemical treatments. For example, an aluminum surface is usually cleaned to remove oils and other contaminants. This cleaning is then followed by a mechanical or electrochemical graining process, and finally an anodizing process.

For example, U.S. Pat. No. 3,963,594 discloses the electrochemical etching of an aluminum substrate with an aqueous solution of hydrochloric acid and gluconic acid. This provides a uniformly coarse surface texture to the aluminum substrate. The process of that patent permits the use of lower current densities than were found to be necessary when using only hydrochloric acid in the bath. The treatment also complexed dissolved aluminum and other impurities which form in the etching bath. This extended the life of the bath. Desmutting treatments were also shown in combination with the electrochemical etching.

British Pat. No. 1,439,127 discloses an anodizing treatment for aluminum substrates in which the anodization is performed in an aqueous sulfuric acid bath at a temperature in excess of 70° C. and with an anodizing current density of at least 50 amps/sq. ft. This treatment reduces the length of time in which the anodizing step is performed. Other etching solution compositions and electrical parameters are disclosed in U.S. Pat. Nos. 4,072,589 and 4,052,275 and French Pat. No. 2,322,015.

After electrochemical or mechanical etching of the aluminum surface, an anodically oxidizing treatment is usually performed to render the aluminum surface both corrosion resistant and wear resistant. This is shown in British Pat. No. 1,439,127 discussed above and in U.S. Pat. No. 4,131,518. In this latter patent, aluminum foil in the form of a continuous web, particularly when the aluminum carries a polymeric coating on one side thereof, is anodized so that energy requirements are reduced and anodizing speeds are increased.

U.S. Pat. No. 3,181,461 discloses an anodizing process in which the sulfuric acid anodizing step is followed by treatment with an aqueous solution of sodium silicate. This treatment seals the pores of the anodic oxide surface and provides a hydrophilic, ink-repelling surface layer.

German Patent (Offenlegungsschrift) No. 24 34 098 discusses firing a composition of aluminum phosphate and silicon carbide particles onto a metal surface for the purpose of increasing its wear resistance. However, this invention of German Pat. No. 24 34 098 is not suitable for use on lithographic plates and is not coated on aluminum surfaces.

The practice of treating lithographic substrates of aluminum in order to increase surface areas and enable anodic coatings is well described in the art such as U.S. Pat. Nos. 3,935,080; 3,929,591; 3,980,539; and 3,988,217.

Even though anodizing has become the most common means of providing an aluminum substrate for durable planographic printing plates, and even though some reduction of energy requirements has been made, the process still requires large amounts of electrical energy in its operation and also generates effluents that must be carefully disposed of to avoid environmental pollution.

A novel method for providing textured surfaces on lithographic printing plate substrates of aluminum was disclosed in U.S. Pat. No. 3,210,184. A layer of boehmite (aluminum oxide monohydrate) was produced on the aluminum substrate by bathing the aluminum in hot water or steam in the presence of a weak organic base. Printing plates using the textured substrate were shown to provide increased numbers of copies under comparable conditions as compared to printing plates using mechanically roughened aluminum substrates.

U.S. Pat. Nos. 3,871,881 and 3,975,197 disclose another method of enhancing the physical properties of aluminum surfaces. Various types of particulate material are bonded to the surface of the aluminum by an in situ formed binder of aluminum hydroxyoxide. The enhanced aluminum article is suggested for use as a susbstrate for printing plates.

U.S. Pat. No. 4,319,924 discloses an aqueous coating composition comprising, in coating forming proportions: dissolved phosphate; dissolved dichromate; dissolved aluminum; and dispersed solid particulate material, preferably an aluminum-containing material. This composition is capable of being heat-cured at elevated temperatures into a water-insoluble material. The composition further comprises diethanolamine in an amount sufficient to reduce the temperature at which said composition can be cured into the water-insoluble material.

It is disclosed in the description of the present invention that a novel process for treating lithographic quality aluminum foil can provide a durable, long-running substrate for lithographic plate constructions. This process provides a novel substrate which can be resistant to the chemical action of the printing plate developers and press solvents. The novel substrate also enables the bonding of many photoreactive imaging layers to the treated aluminum substrate without the need for primers or other adhesion promoting agents.

SUMMARY OF THE INVENTION

A process is disclosed for firing a slurry of particles and a phosphate binder. The particles are preferably weakly basic or amphoteric non-metallic particles and the composition is fired on an aluminum or aluminized substrate. This process produces an aluminum substrate or aluminized surface of a sheet bearing a textured layer of hard particles bonded together by a water resistant phase, or phases, of a dehydration products of monobasic phosphates such as those of aluminum and/or magnesium, alone or in combination with the products of their reaction with some or all of the particles, on at least one surface of the sheet. This textured layer has been found to provide an excellent surface for adhesion of organic materials. In particular, the phosphates strongly bind and adhere the particles into a layer having excellent adhesion for diazonium resins and photopolymeric compositions used in the printing art and particularly in the planographic printing art. This adhesion is enhanced by the surface texture and improved chemical stability imparted by the particles.

DETAILED DESCRIPTION OF THE INVENTION

The process of forming phosphate coatings on substrates according to the present invention provides a number of improvements over prior art processes for producing substrates for photoimaging elements, particularly in the continuous manufacture of substrates. Not only does the coated substrate of the present invention have equivalent or improved properties as compared to materials of the prior art, but also it provides significant economic advantages in its manufacture. Apparatus used in the process consists of fewer separate items of equipment, thus requiring a lower capital investment than conventional forms of continuous substrate formation. The significant equipment eliminated includes the anodizing facility which is itself costly to operate because of high energy requirements and the need for safe effluent disposal. Such equipment is desirably eliminated from a substrate manufacturing line because of associated electrochemical corrosion problems of other equipment on the same production line. The coating layer produced according to the present invention does not require etching or other texturizing. Such other texturizing may be optionally performed to provide additional characteristics to the surface. The elimination of such texturizing processes provides a further increment of cost reduction. The process can be readily performed in a continuous fashion and has been found to provide results substantially identical to those of a batch process.

A coating of a monobasic phosphate solution forming a slurry with metal oxide particles is applied to a clean aluminum or aluminized surface. This coating is fired at a temperature of at least 450° F. (230° C.), preferably at least 500° or 550° F. (260° or 290° C.), to produce a textured ceramic coating of a phosphate glass. This may comprise non-metallic and especially metal oxide particles embedded in a vitreous, water resistant phase or phases of a dehydration product of monobasic phosphates such as those of aluminum and/or magnesium, alone or in combination with the products of their reaction with some or all of the particles. Other monobasic phosphates which are acceptable include those of zinc, calcium, iron, and beryllium. When the metal oxide is alumina, the bonding phase between the phosphate glass and the alumina is most likely aluminum orthophosphate. The firing should be performed for a long enough time at these temperatures to insure substantially complete dehydration of the coating. This may take place in as little time as three seconds at the described temperature depending upon the thickness of the coating and the temperature and other parameters of the firing process. The ceramic surface may be further treated as by etching to provide particularly desired textures and properties to the surface, but the surface resulting from the firing already is textured. This optional treating is not critical or essential to the present invention and is most generally performed in conjunction with imaging systems (e.g., lithographic printing plates) which are optimized by a silicate treatment of the substrate or some other analogous layer. Etching, for example, can be accomplished by using known alkaline silicate solutions which will deposit a silicate coating at the same time. Where no silicating is required or where the subsequently applied light sensitive composition would not be compatible with a silicate surface, the etch may be performed in alkaline phosphate or aluminate solutions, for example. The aluminum or aluminized substrate may initially have a texturized surface so that etching of the ceramic coating will expose the texture through the ceramic coating. This is unnecessary, however, in the practice of the present invention because of the natural texture produced in the process. This natural texture, which is a microscopic texturing visible by light scattering or under magnification, provides a physical structure to which subsequently applied light sensitive coating compositions may adhere.

An optional post-firing etch may remove whatever amount of the dehydrated ceramic coating is necessary to provide the character required in the texture of the substrate. As little as five percent and as much as sixty percent by weight or more of the ceramic coating may be removed. The length of time of the etch is regulated by the temperature and pH of the etching environment. Higher temperatures and higher pH levels provide faster etches. The pH may be controlled by the addition of alkaline hydroxides such as sodium hydroxide. Replenishing solutions may be added during the continuous processing operation to replace any material, such as the alkali component, which is depleted during the etch. The combined etch and silicating solutions are generally optimized to emphasize the silicating treatment, since the silicate etch has a wider performance latitude than phosphate or aluminate etching solutions. The silicates used for the combined etching and silicating baths are preferably at the high silica content end of the commercially available materials. Such materials as "Kasil #1" or "S-35" of the Philadelphia Quartz Co. or mixtures of "S-35" with a fine silica sol (e.g., Sol #1115 of Nalco Chemical Co.) are particularly useful when diluted with water to give solutions having approximately one percent silica on a dry weight basis.

The texturized substrates produced on the ceramic coated aluminum or aluminized substrate by the firing step may then be coated with a light sensitive composition either directly or with an intermediate sublayer. An oligomeric diazonium resin and/or an organic negative or positive acting photosensitive composition may be desirably applied to the textured surface.

A broad range of photosensitive compositions having various different fields of utility are known to those of ordinary skill. The types of photosensitive coatings useful in the practice of the present invention are those which would ordinarily be considered for use in the printing plate art, and specifically, lithographic and relief compositions. These compositions would include both negative and positive acting lithographic compositions and negative acting relief compositions.

Negative acting compositions ordinarily perform by having a photopolymerizable composition which becomes less soluble and/or more highly polymerized when struck by actinic radiation in an imagewise pattern. This is ordinarily accomplished by having a mixture of materials including such various ingredients as binders, polymerizable materials (monomers, oligomers and polymers), photoinitiator catalysts for the polymerizable materials, sensitizers for the photocatalysts, and various other ingredients such as oleophilicity enhancers, pigments, surfactants, coating aids and other ingredients known in the art. After imagewise exposure to actinic radiation, the unreacted, more soluble areas of the coating composition are removed by washing with various solvents including water, aqueous alkaline solutions and organic developers. Amongst the most common materials used in the formation of negative acting lithographic printing compositions are ethylenically unsaturated monomers and photoinitiated free radical generators.

Organic and methacrylic polymerizable materials are the most frequently utilized components, but all other ethylenically unsaturated materials and copolymerizable ingredients are useful and known in the art. See, for example, U.S. Pat. Nos. 4,316,949, 4,228,232, 3,895,949, 3,887,450, and 3,827,956.

Positive acting lithographic compositions ordinarily comprise a binder of thermoplastic or partially cross-linked compositions which contain a positive acting photosensitizer which, when struck by light, becomes more soluble in selected solvents than the non-light exposed sensitizer. The most common photosensitizers used in the art are o-quinone diazide compounds and polymers. Various binders such as acrylic resins, phenol formaldehyde resins (particularly novolaks), polyvinyl acetal resins, and cellulosic esters are also generally known in the art for use with this type of photosensitizer. See, for example, U.S. Pat. Nos. 4,193,797; 4,189,320; 4,169,732 and 4,247,616.

Negative acting relief compositions work in similar fashion to negative acting lithographic systems, except that the layers are considerably thicker and that molds and embossing are often used to impress the surface structure when forming the relief image.

The ceramic surface provided on the aluminum substrate is highly water receptive and has been shown to be at least as hydrophilic as anodized aluminum. The surface provides excellent adhesion for polymeric and oligomeric compositions. The surface has been found to provide particularly excellent adhesion for positive acting photosensitive compositions such as those containing diazo oxides and diazo sulfides, and provides good resistance to the developing solutions used which are generally highly alkaline.

The thickness of the ceramic coating can readily be varied as desired, for example, between 0.2 and 15 micrometers. Preferably, for use as a substrate for planographic printing plates, the coating layer is between 0.3 and 10 micrometers and more preferably is between 0.5 and 5 micrometers.

The firing temperatures used in the practice of the present invention must be higher than 450° or 500° F. (230° or 260° C.) and preferably are at least 550° F. (285° C.). Temperatures higher than 700° F. (370° C.) do not offer any significant advantages and raise the energy requirements of the process and may distort or weaken the substrate. These temperatures refer to the surface temperature of the coating, measured by contacting the coating surface with the bare junction of a thermocouple. It will be understood that many different types of ovens having a variety of control characteristics may be used for achieving the required surface temperatures. The control temperature may in fact differ substantially from the surface temperature measured in the manner described above.

The particulate matter added to the monobasic phosphate to form a slurry may have a considerable range and constitute substantially any non-metallic inorganic particle. By non-metallic, it is meant that the particle should not have such a high proportion of free metal (greater than 25% by weight on the surface) as would interfere with lithographic compositions.

By the term 'particulate,' as used in the practice of the present invention, it is understood that particles within a broad size range are useful. Particles small enough to form colloidal dispersions, e.g., as small as average sizes of $5\times10^{-3}$ micrometers and preferably no smaller than $1\times10^{-3}$ micrometers are quite useful up to 45 micrometers. The preferred size range is between $10^{-2}$ and 45 micrometers, and the most preferred range is between $10^{-2}$ and 5 micrometers. If highly reactive particles are used, they will in effect dissolve away (in whole or in part) by reaction of material from the surface of the particle. Thus, surprisingly large particles can be used which would not interfere with the physical properties of the surface. Agglomerated particles having an effective large size which can be broken down during processing may also be used.

The metal oxides, for example, may include alumina (in various phases such as alpha, beta, theta, and gamma alumina), chromia, titania, zirconia, zinc oxide, stannous oxide, stannic oxide, beryllia, boria, silica, magnesium oxide, etc. Certain oxides and even certain different phases of the oxides or mixtures thereof perform better than others. For example, the use of mixtures of alpha alumina and certain reactive transition aluminas such as the theta and gamma alumina provides a surface having improved properties over that obtained with particles of a single alumina phase. The presence of the alpha phase in the slurry provides a ceramic coating with increased wear resistance and the presence of the other phases, or other metal oxide particles, tends to provide a more finely textured surface than alpha alumina by itself. By 'reactive' it is meant that the oxide reacts with monobasic phosphate during firing conditions.

Particulate materials which react with the acid or monobasic phosphate give more alkali-resistant binder compositions. When such materials are added in excess of the amount that will react fully with phosphate, they may additionally contribute to the surface texture of the fired coating. If they are in a form that reacts slowly or not at all at room temperature, they may contribute to the consistency or viscosity of the slurry, giving a formulation that may be particularly well-adapted for particular coating methods. Furthermore, some of these materials detract from or add to the hydrophilicity of the phosphate coating in a controlled way. In summary, then, there can be added to the slurry a blend of reactive, fine, particulate materials that maximize resistance to alkaline attack, optimize slurry consistency for the slurry solids fraction and the particular coating process, and give the hydrophilicity and microtexture that are most compatible with the intended image coating system.

A reactive inorganic material most desirably present is a magnesium compound. Magnesium carbonate, magnesium oxide, magnesium hydroxide, and monomagnesium phosphate have been used, and the characteristic, desirable, contribution to alkali resistance was obtained in each case. Zinc oxide, zinc carbonate or zinc phosphate could be substituted for the magnesium compound, though slightly poorer alkali resistance was obtained with the zinc compounds than with the magnesium compounds.

The amount of magnesia, i.e., magnesium oxide or magnesium hydroxide, generally added is not enough to yield a fully tribasic (dehydrated) phosphate composition upon firing, so additions of other materials supplying polyvalent cations will in general give further alkali resistance. Hydrated or transition aluminas, sols of many metal oxides, or blends of these materials, may be added, generally together with magnesia and generally in such proportions as to optimize the coating as noted above. The graded gamma-theta alumina designated "GB 2500" by its supplier, the Micro Abrasives Corp. of Westfield, Mass., the hydrated alumina "Hydral 710" supplied by the Aluminum Co. of America, the predominantly boehmite product, "Dispural", supplied by Condea Chemie GMBH, 2000 Hamburg 13, West Germany; the "Aluminum Oxide C" of Degussa Pigments Division, D-6000 Frankfurt 1, West Germany; and the alumina, chromia, yttria, zirconia, and ceria sols supplied by Nyacol Inc., Ashland, Mass., are examples of reactive materials useful in combination with the suggested magnesium compounds. This list is intended to be suggestive rather than exhaustive. Many other compounds are expected to be useful as reactive materials in the form of sols or fine powders: compounds such as titanium dioxide, calcium hydroxide, calcium oxide, calcium fluoride, or calcium phosphate, beryllium oxide, ammonium fluorotitanate, and tungstic oxide are suggested by the literature as useful constituents of phosphate glasses.

The resulting fired slurries tolerated moderate levels of alkali metal oxides, such that commercial or technical grades of materials are generally acceptable; however, compounds containing major amounts of alkali metal cations are not recommended. When silica sol is added, compensating extra metallic oxide should also be added to optimize alkali resistance.

In addition to reactive inorganic particulate materials or some blend thereof, particles of hard, wear-resistant materials may be added with good effect. In general these are expected to react only superficially with the phosphate bonding material, and not to contribute substantially to insolubilization. Graded alpha alumina of the type of "381200 Alundum", supplied by the Norton Co. of Troy, N.Y., or "WSK 1200" white alumina supplied by Treibacher GMBH of Treibach, Austria, and various grades of "WCA" alumina supplied by Micro Abrasives Corp., are useful. It is necessary to burn off organic contaminants, as by kiln firing, from some of these materials. Graded tin oxide supplied by Transelco, Inc. of Penn Yan, N.Y., was substituted for or blended with alumina in several proportions without loss of properties. Graded fine sands of other hard materials such as quartz, amorphous silica, cerium oxide, zirconia, zircon, spinel, aluminum silicate (mullite), and even hydrophobic particles such as silicon carbide, among many others, would be expected to function satisfactorily, though perhaps (as compared to alumina) to have less attractive cost or availability as closely-sized powders. It is preferred to use hydrophilic particles in the practice of the present invention, and especially metal oxides.

These hard particles contribute wear resistance and coarse roughness to the fired coating. The amount and size to be added depends on development of optimum compatibility with the desired image coating system, to the extent such compatibility depends on coarse roughness, measurable as "Arithmetic Average Roughness" using a profile measuring instrument. Examples of such instruments are the Federal Products Corp. (Providence, R.I.) "Surfanalyzer", and the Bendix Co. (Ann Arbor, Mich.) "Proficorder".

It is well known that different lithographic substrate texturizing processes and the variation of conditions within these processes provide different ranges of arithmetic average roughness and different combinations of arithmetic average roughness and specific surface area. The optimum combination of these characteristics depends upon the type of use to which the final lithographic plate is subjected and the particular photosensitive composition applied thereto. Important characteristics to be considered with regard to selecting combinations of these characteristics with specific photosensitive compositions include the mechanical adhesion and release properties (e.g., developability) of the imaged coating. By adjusting the size, type, fraction, and mix of particles in the coating composition, the coating process of the present invention can provide substrates over most of the range of roughness and specific surface areas produced by all of the prior art processes. The present process is highly flexible and can be readily altered to provide substrates which fit changed requirements.

It should be noted that one can practice the present invention by forming monoaluminum phosphate or other acid phosphates in situ during the firing step. This can be accomplished, for example, by coating a slurry of phosphoric acid and a stoichiometric excess of reactive alumina onto the aluminum or aluminized surface to be fired. Aluminum phosphate is generated during the initial firing period, and with a stoichiometric excess of alumina present, reactive alumina particulate material will remain in the reactive composition during the continued firing. This is sufficient to provide coatings according to the present invention, and the formation of monoaluminum phosphate or other aluminum phosphates or mixed phosphates of aluminum and other metals in situ is contemplated as being within the scope of practicing the present invention.

In addition to the foregoing in situ formation by reaction of excess metal oxide or hydroxide with phosphoric acid, it is also possible to form monoaluminum phosphate in situ or mixed phosphates of aluminum and other metals in situ by reacting stoichiometrically equivalent amounts of reactive alumina, i.e., aluminum oxide or aluminum hydroxide, with either phosphoric acid or an alkaline earth acid phosphate such as monomagnesium phosphate solution. The interchangeability of monoaluminum phosphate with a reaction mixture containing alumina and phosphoric acid or an alkaline earth acid phosphate is shown by the following equivalences:

$$3Ca(H_2PO_4)_2+Al_2O_3=2Al(H_2PO_4)_3+3CaO$$

$$3Mg(H_2PO_4)_2+Al_2O_3=2Al(H_2PO_4)_3+3MgO$$

$$Al(OH)_3+3H_3PO_4=Al(H_2PO_4)_3+3H_2O$$

$$Al_2O_3+6H_3PO_4=2Al(H_2PO_4)_3+3H_2O$$

The foregoing reactions are not necessarily of practical significance.

Further, alkaline earth acid phosphates may be created in solution by mixing an appropriate alkaline earth tribasic phosphate with phosphoric acid. For example, $$Ca_3(PO_4)_2+4H_3PO_4=3Ca(H_2PO_4)_2$$

$$Mg_3(PO_4)_2+4H_3PO_4=3Mg(H_2PO_4)_2$$

$$Mg_3(PO_4)_2+H_3PO_4=3MgHPO_4$$

The following reactions demonstrate the processes which create orthophosphates during firing with phosphoric acid and/or a suitable acidic phosphate starting material:

$$2H_3PO_4 + Al_2O_3 \xrightarrow[\Delta]{} 2AlPO_4 + 3H_2O$$

$$Al(H_2PO_4)_3 + Al_2O_3 \xrightarrow[\Delta]{} 3AlPO_4 + 3H_2O$$

$$Al(H_2PO_4)_3 + 3MgO \xrightarrow[\Delta]{} AlPO_4 + Mg_3(PO_4)_2 + 3H_2O$$

$$3Mg(H_2PO_4)_2 + 2Al_2O_3 \xrightarrow[\Delta]{} 4AlPO_4 + Mg_3(PO_4)_2 + 6H_2O$$

$$6Ca(OH)_2 + 3Mg(H_2PO_4)_2 \xrightarrow[\Delta]{} 2Ca_3(PO_4)_2 + Mg_3(PO_4)_2 + 12H_2O$$

It has been found that addition of calcium-containing inorganic compounds to the slurry reduces the necessity for close monitoring of the firing temperature, by providing a mixture that is effectively dehydrated at somewhat lower temperatures or shorter times. The calcium addition is preferably in the form of calcium hydroxide, calcium carbonate, calcium oxide, calcium phosphate, or mixtures thereof. To achieve this useful result it is also desirable to add the magnesium-containing compound as a soluble phosphate and the aluminum-containing compound in an ultrafine and/or dissolved condition.

It has also been found that addition of calcium-containing inorganic compounds to the slurry contributes to a coating composition that may be fired at a lower temperature or in less time, while retaining lithographic quality at greater coating thicknesses than previously possible. The aluminum-containing compound may be a fumed alumina, e.g. that produced by flame hydrolysis of anhydrous aluminum chloride, having mean ultimate particle diameter less than 20 nanometers. When all the constituents which are required to react to form an intimately dispersed, uniform phosphate phase are in the most rapidly reactive forms currently available as chemical raw materials, better functional properties at the lower firing times and/or temperatures are obtained. It should be noted that too great a stoichiometric excess of reactive cation-supplying materials over anion supplying materials, i.e. phosphate and silicate, tends to weaken the coating mechanically, giving less abrasion resistance of the type described by ANSI-ASTM tests C501-66 and D1044-76, or a test combining some of the features of each of the two standard tests.

The slurries or solutions generally contain between 85 and 95% (by volume) of material that is volatile upon firing, the actual amount being that required to yield a satisfactory coating weight and satisfactory coatability with the chosen coating technique. A mixture of 50% aqueous monoaluminum phosphate solution with an equal weight of water, falls easily in this range, as do slurries which contain a greater number of additives. The volatile material is generally water, although water-miscible volatile liquids such as alcohols may be added in substantial part. The volume of volatile material stated above includes both the volatile material added as solvent or diluent, and that generated by reactions such as pyrolysis of organics or acid-base metathesis.

The second largest constituent of the slurries or solutions, which constituent may or may not be present, is a form of hard particles, such as the alpha aluminas mentioned previously. These may comprise between zero and 65% of the volume of the non-volatile portion. The size, shape, volume and type of hard particles is varied as needed to accommodate the intended specific use of the ceramic-coated material. A coating containing more than 65% hard particles by volume will be too lean in binder material with the result that the hard particles will not be securely bonded, and the voids between them may tend to trap ink in areas required to remain free of ink when the coating is used as a lithographic substrate. A fired film containing 45–60% by volume hard particles is dominated by relatively coarse features. This type of surface is desirable for use with some image coatings. Fired films containing less than 50% by volume hard particles may have their surfaces increasingly dominated by ultrafine features, because the relative volume of hard particles declines, while the relative volume of ultrafine particles increases. The ultrafine features are more desirable for use with some image coatings. Sedimentation and agglomeration of hard particles may be a source of coating problems. Where a formulation is required wherein the main characteristic is ease of coating with simple apparatus, the reduction of the volume of, or the complete elimination of, the coarser particles may be preferable. The hard particles considered for use in this invention react so slowly with phosphate solutions that they are presumed to undergo negligible reaction during firing.

The remaining constituent of the slurry formulation is a matrix or bonding constituent. In the simplest form, phosphoric acid alone may be coated and fired; however, useful properties are enhanced by using acid phosphates, such as monoaluminum phosphate, and/or reactive particles, such as alumina.

Greater chemical resistance than can be obtained with a coating derived from phosphoric acid employed by itself is essential or at least preferred. To obtain greater chemical resistance, reactive particles which yield metal ions should be added to the phosphate solution in quantities sufficient that an orthophosphate or mixture of orthophosphates is created upon firing.

Where the reactive particles are of a chemical species which yield calcium ions, a quantity ranging from about 0 to about 20% of the amount that would combine with the available phosphate ions to give calcium orthophosphate is used. Calcium additions in excess of 20% result in coagulation of the slurry, and are likely to result in a decline in acid resistance of the final article. Quantities in the range of about 4 to about 7% give the maximum reduction of firing temperature with no noticeable degradation of acid resistance or slurry viscosity. A solution of monocalcium phosphate, rather than particles which yield calcium ions, may be used to provide the calcium content.

Where the reactive particles are of a chemical species which yield magnesium ions, a quantity ranging from about 0 to about 35% of the amount that would combine with the available phosphate to give magnesium orthophosphate, is used. Quantities in the range of about 10 to about 20% are preferred. Where magnesium-containing particles are added at a level greater than 35% to monoaluminum phosphate, the resulting coating will flake away from the aluminum substrate upon cooling down from the firing temperature. Amounts of magnesium at lower than the 10% level are found to provide a less than optimum contribution to alkali resistance. Commercial monomagnesium phosphate solution, containing 5.3% MgO and 32.6% $P_2O_5$ by weight, may be used to provide magnesium ions since the amounts of magnesium and phosphate provided by this solution, with no other phosphate addition, give a magnesium ion addition of 19.1% of the amount required to yield magnesium orthophosphate.

Reactive particles yielding aluminum ions may be added in quantities ranging from about 0 to about 200% of the amount which, in combination with all other metal and phosphate ions present or liberated during firing, would give stoichiometric orthophosphate. The preferred range is 100–150%. For example, if the quantity of calcium-containing material in the phosphate solution slurry were 5% of the amount that would give calcium orthophosphate, and if the quantity of magnesium-containing material in the phosphate solution slurry were 15% of the amount that would give magnesium orthophosphate, then the preferred amount of aluminum ion-containing material to be added would be in the range of 80–130% of the amount that would yield aluminum orthophosphate. If another reactive cation were present, sufficient additional aluminum ion would have to be provided in excess of the 100–150% orthophosphate level to form the other reactive cation's ortho-compound for the preferred compositions (e.g., if the other cation were silica, then sufficient additional aluminum ion-containing material would have to be provided to form aluminum orthosilicate). Aluminum contents below 100% result in coatings lacking chemical resistance, and aluminum contents above 150%, in combination with a typical loading of hard particles, result in decreased wear resistance of the coating. The excess of unreacted fine particles have utility as a filler or flatting agent, imparting a useful microtexture or chemical character to the surface of the fired film. It is conceivable that the total fine aluminum reactive particle content could be raised into the 150–200% range, with the resulting improvement in anchorage for the overcoated material compensating for the loss of basic abrasion resistance.

Dispersants such as gluconic acid may also be added to the slurry. Alkaline dispersants such as sodium tripolyphosphates are not preferred even though they do not destroy the function of the present invention. Pretreatment of the coarsest particles as with colloidal silica, may make the resulting slurries more stable against sedimentation.

Lithographically useful compositions may, of course, be coated on the ceramic surface. Such compositions would comprise (1) oligomeric diazonium resins, (2) positive acting diazo oxides or esters, (3) photopolymerizable organic compositions (particularly such as ethylenically unsaturated materials in the presence of free radical photoinitiators), (4) oligomeric diazonium resin undercoats with photopolymerizable organic composition overcoats, and (5) any other various well known lithographically useful photosensitive compositions.

These and other aspects of the present invention will become apparent from the following examples.

EXAMPLE 1

A precleaned aluminum foil was coated with a solution of 50 weight percent monoaluminum phosphate in water and dried below 100° C. to a coating thickness of about 3 micrometers. The surface temperature of the coating was raised to 550° F. (260° C.) in ninety seconds in an oven and removed after thirty seconds at that temperature. A positive acting photosensitive composition as described in Example 3 of U.S. Pat. No. 4,247,616 was coated onto the treated surface after rinsing and drying. The composition adhered to the substrate and developed off cleanly after exposure.

EXAMPLE 2

A precleaned aluminum foil was coated with a composition comprising, by weight, 12% transition alumina (nominally 0.5 micrometers diameter of gamma or theta phase alumina), 15% monoaluminum phosphate, 0.75% magnesium oxide (particle size less than 200 mesh), and 72.25% water. The coating was dried to a thickness of about 3 micrometers.

The coated foil was placed in an oven and the surface temperature of the coating was raised to 550° F. (260° C.) in thirty seconds. Dwell time in the oven was one and one half minutes. The coated foil was cooled, rinsed, and dried, then rolled up.

The foil was subsequently unrolled and coated with the positive acting photosensitive composition of the previous example. The photosensitive layer adhered well to the substrate and developed off cleanly with no undesirable undercutting of the half tone image. The background areas were less readily attacked by alkaline developer than was the substrate of Example 1. There was also better adhesion on press because of reduced undercutting and a further increase in adhesion due to surface texture provided.

EXAMPLE 3

The procedure of Example 2 was repeated except that 1% zinc oxide was used in place of the magnesium oxide and correspondingly less water was used. The coated aluminum was found to be somewhat less resistant to developer chemicals than the sheet of Example 2, but still provided excellent adherence to the photosensitive layer and provided a useful printing plate surface.

EXAMPLE 4

The procedure of Example 2 was repeated, using the same coating composition, but with firing effected at 600° F. (310° C.). No differences were observed between the mechanical or chemical properties of the materials. Both were presumed to be fully dehydrated.

EXAMPLE 5

The procedure of Example 2 was repeated using a coating composition having 8 percent reactive (e.g., theta transition alumina) alumina (nominally 0.5 microns diameter), 0.5 percent dead-burned magnesia (particle size less than 200 mesh), and 4.0 percent alpha alumina (nominally 1.0 microns average diameter). These were dispersed as a 30% raw solids slurry in 0.5 percent aqueous gluconic acid. A water and monoaluminum phosphate solution was used to provide the above weight percentages of metal oxides and 15 percent by weight of monoaluminum phosphate and 66 percent water. The alpha alumina content conferred additional wear resistance and a higher arithmetic average roughness to the fired coating. These additional properties are advantageous in many image coating systems.

EXAMPLE 6

The fired substrate of Example 2 was immersed for 2½ minutes in a solution containing 5% by weight Phila. Quartz Co. "Star" brand sodium silicate solution at 95° C., then rinsed in a deionized water spray and dried. It was coated with a negative oligomeric diazonium resin and an 8 micron dried thickness coating of the negative photopolymeric composition of Example 2 of U.S. Ser. No. 103,712, filed Dec. 14, 1979. The image developed cleanly upon conventional exposure and development. It gave many thousands of good inked impressions during an accelerated press wear test, at least equalling the wear performance of the same image material on conventional grained and anodized aluminum.

EXAMPLE 7

A slurry was prepared consisting of 19.1% (wt.) Norton Co. "#381200 Alundum" brand alpha alumina (prior to addition it had been cleaned by firing overnight in air at 600° C.); 2.4% Alcoa "Hydral 710" alumina trihydrate; 0.75% Condea Chemie "Dispural 10/2" alumina monohydrate; 0.36% Martin Marietta "MagChem 10" magnesia, and 14.4% 50% monoaluminum phosphate solution, plus some surface-active materials as follows. The dry powders were milled together as a 30% solids slurry. First the alpha alumina was milled alone in a solution containing all the water of the 30% slurry and 2% of the weight of alumina as Nalco "Nalcoag 1115" colloidal silica, for one hour. Then enough 50% gluconic acid was added to make the aqueous phase 0.5% acid, and the balance of the dry solids were added, and milling continued for 12 hours. A weighed sample of the 30% slurry was added to a container with enough additional distilled water and 50% monoaluminum phosphate solution to yield the above proportions, and the combination stirred with a propellor mixer and roll coated onto sheets of aluminum alloy cleaned by trisodium phosphate (3% solution at 160° F.) etching, rinsing, and desmutting in 50% $HNO_3$, rinsing, and drying. The coated sheets dried in room air, and were fired 2 min. in an oven whose circulating air temperature was given by the oven control thermometer as 650° F. (This thermal exposure had previously been found to yield a surface temperature of 550° F. during the final 30 sec.) When cooled and coated with a positive-working image composition of the diazo oxide-phenolic resin type well known in the art, the resulting lithographic plate was capable of state-of-the-art performance, with regard to image contrast, developer resistance, and wear life, as determined by accelerated wear tests.

EXAMPLE 8

A slurry was prepared, coated and fired similarly to that of Example 7 except that the proportions were grade 1200 alpha alumina, 17.8%; Alcoa "Hydral 710", 3.2%; Condea "Dispural 10/2" 0.7%; MgO, 0.38%; the milling times were 30 min. for alpha alumina in silica sol, and 4 hours for all solids at 40% solids; the phosphate addition was 15.4% 50% monoaluminum phosphate solution. The resulting slurry was readily roll coatable on etched and desmutted aluminum, and also onto lithographic aluminum alloy precleaned by brushing with a motor-driven cylindrical "Scotch-brite" Type A Very Fine flap brush, while being sprayed with 150° F., 3% solution of Oakite "#166" metal cleaner, then rinsing and air drying. The resulting lithoplates conformed to the standards established for Example 7.

EXAMPLE 9

The slurry of Example 8 was roll coated onto Bethlehem Steel Co. "Duraskin" sheet, which is steel sheet plated with a predominately aluminum, aluminum-zinc-silicon alloy, and rerolled to 0.010 in. thickness. The "Duraskin" sheet was precleaned using the same "Scotch-brite" brushing technique described in Example 8. The fired material functioned very well as the substrate for either negative- or positive-working, long-wear life, lithographic plates; no significant differences being observed between it and the lithoplates of Example 8 in its image contrast or resolution, or its wear characteristics.

EXAMPLE 10

A slurry was prepared consisting of 19.05% (wt/wt) of "Imsil A-10" amorphous silica, said by the Illinois Minerals Co. of Cairo, Ill., to have a mean particle diameter of 2.2 micrometers; 0.65% "Aluminum Oxide C", said by the Degussa Pigments Division of Frankfurt, Germany to have a mean particle diameter of 0.02 micrometers; 32.9% deionized water; and 47.4% of the Mobil Chemical Co. 50% monoaluminum phosphate solution. The silica and colloidal alumina were first mixed together in the water, then the phosphate solution was added. This slurry was coated onto the substrate of Example 7 and fired as in the same Example. It was then immersed 25 seconds in an 80° C. solution containing 4.8 wt. % "Kasil No. 1" potassium silicate solution available from the Philadelphia Quartz Co., rinsed in deionized water and air dried. The resulting sheet was primed with a negative-working diazo compound and overcoated with a negative-working photopolymer of a type well-known in the art. The resulting printing plate was exposed to a test negative and developed with 3M Subtractive Developer. It was found to have commercially acceptable photospeed, contrast, resolution, and press life.

EXAMPLE 11

A slurry was prepared consisting of 15.08% (wt.) Norton Co. "#381200 Alundum" brand alpha alumina (prior to addition it has been cleaned by firing overnight in air at 600° C.), 0.45% (wt.) "Nalcoag 1115" 15% aqueous colloidal silica suspension, 0.45% (wt.) 50% aqueous gluconic acid solution, 62.12% (wt.) deionized water, 2.72% (wt.) "Aluminum Oxide C", manufactured by Degussa Pigments Division of Frankfurt, Germany, 0.96% (wt.) Condea Chemie "Dispural 10/2" alumina monohydrate, 4.13% (wt.) 50% aqueous monoaluminum phosphate solution from Mobil Chemical Co., 13.48% (wt.) commercial magnesium phosphate solution containing 3.3% magnesium and 14.2% phosphorus from Mobil Chemical Co., and 0.61% (wt.) reagent calcium hydroxide. This formulation was coated onto lithographic aluminum at a coating weight in the range of 325 to 400 mg/square foot and fired at a temperature of approximately 550° F. for one minute. When cooled and coated with a positive working composition of the diazo oxide-phenolic resin type well known in the art, the resulting lithographic plate was capable of state-of-the-art performance, with regard to resolution, ink/water balance, and wear life, as determined by accelerated wear tests.

EXAMPLE 12

A slurry was prepared consisting of 18.64% (wt.) Treibacher "WSK" F1200 alumina (prior to addition it had been cleaned by calcining at 600° C.) 0.56% (wt.) "Nalcoag 1115" 15% aqueous colloidal silica suspension, 0.44% (wt.) 50% aqueous gluconic acid solution, 58.64% (wt.) deionized water, 4.21% (wt.) "Aluminum Oxide C", manufactured by Degussa Pigments Division of Frankfurt, Germany, 17.00% (wt.) commercial magnesium phosphate solution containing 3.3% magnesium and 14.2% phosphorus from Mobil Chemical Co., and 0.51% (wt.) reagent calcium hydroxide. This formulation was coated onto lithographic aluminum at a coating weight in the range of 325 to 400 mg/square foot and fired at a temperature of approximately 550° F. for one minute. When cooled and coated with a positive working composition of the diazo oxide-phenolic resin type well known in the art, the resulting lithographic plate was capable of state-of-the-art performance, with regard to resolution, ink/water balance, and wear life, as determined by accelerated wear tests.

What is claimed is:

1. A photosensitive article comprising:

A. an aluminum or aluminized substrate in the form of a film or sheet bearing on at least one aluminum or aluminized surface thereof a hydrophilic ceramic layer comprising (1) non-metallic inorganic particles and (2) a water-resistant phase, or phases, of a dehydration product of at least one monobasic phosphate; said ceramic layer having a thickness between 0.2 and 15 micrometers and B. a photosensitive lithographic coating over said ceramic layer.

2. The photosensitive article of claim 1 wherein a composition comprising an oligomeric diazonium resin is coated on said ceramic layer.

3. The photosensitive article of claim 1 wherein the cermic layer further comprises the reaction product of said at least one monobasic phosphate with said particles.

4. The photosensitive article of claim 1 wherein said particles comprise metal oxide particles having an average size of from $1\times10^{-3}$ to 45 micrometers.

5. The photosensitive article of claim 4 wherein said lithographic coating comprises a polymerizable composition.

6. The photosensitive article of claim 4 wherein said ceramic layer has a thickness between 0.2 and 15 micrometers and said substrate is aluminum in the form of a film or sheet, and said lithographic coating comprises a positive acting o-quinone diazide in a polymeric binder.

7. The photosensitive article of claim 4 wherein said ceramic layer contains a reaction product of alumina with a monobasic phosphate and a reaction product of at least one metal oxide other than alumina with a monobasic phosphate, the orthophosphate of said at least one metal oxide being insoluble in an aqueous solution having a pH of from 6–12.

8. The photosensitive article of claim 4 wherein said particles are bound into an amorphous phase of aluminum phosphates formed by dehydration of monoaluminum phosphate.

9. The photosensitive article of claim 4 wherein said metal oxide particles comprises magnesia.

10. The photosensitive article of claim 4 wherein said metal oxide particles comprise alumina.

11. The photosensitive article of claim 10 wherein said ceramic layer has a thickness between 0.5 and 5 micrometers.

* * * * *

UNITED STATES PATENT AND TRADEMARK OFFICE
CERTIFICATE OF CORRECTION

PATENT NO. : 4,457,971

DATED : July 3, 1984

INVENTOR(S) : Donald E. Cadwell and Larry A. Brey

It is certified that error appears in the above-identified patent and that said Letters Patent is hereby corrected as shown below:

Cover Page at [75] "Caldwell" should read --Cadwell--.

Column 16, line 17, "cermic" should read --ceramic--.

Signed and Sealed this

*Thirtieth* Day of *April 1985*

[SEAL]

*Attest:*

DONALD J. QUIGG

*Attesting Officer* *Acting Commissioner of Patents and Trademarks*